(12) United States Patent
Aiglstorfer

(10) Patent No.: US 10,592,889 B2
(45) Date of Patent: *Mar. 17, 2020

(54) CLOUD-BASED SYSTEM AND METHODS FOR PROVIDING CONSUMER FINANCIAL DATA

(71) Applicant: mFoundry, Inc., San Francisco, CA (US)

(72) Inventor: Rodney Aiglstorfer, Minden, NV (US)

(73) Assignee: mFoundry, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/998,857

(22) Filed: Aug. 17, 2018

(65) Prior Publication Data

US 2018/0365678 A1    Dec. 20, 2018

Related U.S. Application Data

(63) Continuation of application No. 14/071,869, filed on Nov. 5, 2013, now Pat. No. 10,055,727.

(60) Provisional application No. 61/722,626, filed on Nov. 5, 2012, provisional application No. 61/722,939, filed on Nov. 6, 2012.

(51) Int. Cl.
   *G06Q 40/00*      (2012.01)
   *G06Q 20/32*      (2012.01)
   *G06Q 30/06*      (2012.01)

(52) U.S. Cl.
   CPC ..... *G06Q 20/3223* (2013.01); *G06Q 20/3221* (2013.01); *G06Q 30/06* (2013.01)

(58) Field of Classification Search
   CPC .................................................... G06Q 40/00
   See application file for complete search history.

(56) References Cited

U.S. PATENT DOCUMENTS

| | | | |
|---|---|---|---|
| 6,601,761 B1 | 8/2003 | Katis | |
| 7,693,796 B2 | 4/2010 | Light | |
| 8,855,620 B2 * | 10/2014 | Sievers | G06F 8/65 455/419 |
| 8,931,041 B1 * | 1/2015 | Banerjee | H04L 63/102 726/1 |
| 9,100,400 B2 * | 8/2015 | Lunt | H04L 51/12 |
| 9,300,660 B1 * | 3/2016 | Borowiec | H04L 63/083 |
| 9,444,822 B1 * | 9/2016 | Borowiec | H04L 63/101 |
| 9,639,825 B1 * | 5/2017 | Roth | G06Q 10/10 |

(Continued)

*Primary Examiner* — Chikaodinaka Ojiaku
(74) *Attorney, Agent, or Firm* — Finnegan, Henderson, Farabow, Garrett & Dunner, LLP

(57) ABSTRACT

Systems and methods are disclosed for providing cloud-based access to consumer financial information. A cloud-based platform may receive a notification from a server, the notification comprising a request to access consumer data associated with a financial services account. After confirming authorization by both the associated financial services account provider and the consumer, the platform may configure a software object identifying the server and at least a portion of the consumer data that the server is authorized to access. After presentation of the configured software object by the third party server, the platform may verify the configured software object, and provide to the server access to the authorized consumer data. The server may then utilize the provided consumer data to perform a mobile service for the consumer.

20 Claims, 9 Drawing Sheets

(56) References Cited

U.S. PATENT DOCUMENTS

| | | | | |
|---|---|---|---|---|
| 2001/0029178 | A1* | 10/2001 | Criss | G06F 8/65 455/419 |
| 2001/0032169 | A1* | 10/2001 | Sireau | G06Q 30/08 705/37 |
| 2002/0132662 | A1* | 9/2002 | Sharp | G06Q 20/02 463/25 |
| 2002/0132802 | A1 | 9/2002 | Gharp | |
| 2003/0004871 | A1* | 1/2003 | Rowe | G06Q 20/10 705/39 |
| 2003/0060896 | A9* | 3/2003 | Hulai | G06F 9/451 700/1 |
| 2003/0065738 | A1* | 4/2003 | Yang | G06F 8/65 709/215 |
| 2003/0100301 | A1* | 5/2003 | Fujii | G06F 3/0489 455/426.1 |
| 2003/0105688 | A1* | 6/2003 | Brown | G06Q 20/04 705/31 |
| 2003/0140146 | A1* | 7/2003 | Akers | H04L 29/06 709/227 |
| 2003/0145205 | A1* | 7/2003 | Sarcanin | G06Q 20/02 713/172 |
| 2003/0172090 | A1* | 9/2003 | Asunmaa | G06F 21/31 |
| 2003/0200018 | A1 | 10/2003 | Dominguez | |
| 2003/0200184 | A1* | 10/2003 | Dominguez | G06Q 20/02 705/78 |
| 2003/0208684 | A1* | 11/2003 | Camacho | G06F 21/32 713/186 |
| 2003/0229811 | A1* | 12/2003 | Siegel | G06F 21/10 726/3 |
| 2003/0236867 | A1* | 12/2003 | Natsuno | G06F 21/10 709/220 |
| 2004/0044627 | A1* | 3/2004 | Russell | G06Q 20/00 705/50 |
| 2004/0143550 | A1 | 7/2004 | Creamer | |
| 2004/0153655 | A1* | 8/2004 | Rolfe | G06F 21/32 713/185 |
| 2004/0210891 | A1* | 10/2004 | Kouznetsov | G06F 8/65 717/168 |
| 2004/0249726 | A1* | 12/2004 | Linehan | G06Q 20/0855 705/26.8 |
| 2005/0060238 | A1 | 3/2005 | Gravina | |
| 2005/0102188 | A1* | 5/2005 | Hutchison | G06Q 20/02 705/39 |
| 2005/0136939 | A1* | 6/2005 | Mountain | H04W 8/245 455/453 |
| 2005/0246278 | A1* | 11/2005 | Gerber | G06Q 20/02 705/44 |
| 2006/0006224 | A1* | 1/2006 | Modi | G06Q 20/02 235/379 |
| 2006/0144925 | A1* | 7/2006 | Jones | G06Q 20/40 235/380 |
| 2006/0165060 | A1* | 7/2006 | Dua | G06Q 20/20 370/352 |
| 2007/0125840 | A1 | 6/2007 | Law | |
| 2007/0174295 | A1* | 7/2007 | Abraham | G06Q 10/06375 |
| 2007/0185799 | A1* | 8/2007 | Harrison | G06F 19/328 705/36 T |
| 2007/0185800 | A1* | 8/2007 | Harrison | G06Q 20/20 705/36 T |
| 2007/0185801 | A1* | 8/2007 | Harrison | G06F 19/328 705/36 T |
| 2007/0185802 | A1* | 8/2007 | Harrison | G06F 19/328 705/36 T |
| 2007/0185803 | A1* | 8/2007 | Harrison | G06F 19/328 705/36 T |
| 2007/0194108 | A1* | 8/2007 | Kalappa | G06Q 40/00 235/381 |
| 2007/0194109 | A1* | 8/2007 | Harrison | G06Q 20/20 235/381 |
| 2007/0250920 | A1* | 10/2007 | Lindsay | G06F 21/31 726/7 |
| 2008/0003991 | A1 | 1/2008 | Sievers | |
| 2008/0097871 | A1* | 4/2008 | Williams | G06Q 20/10 705/500 |
| 2008/0098325 | A1* | 4/2008 | Williams | G06Q 30/02 715/781 |
| 2008/0104496 | A1* | 5/2008 | Williams | G06Q 10/107 715/209 |
| 2008/0319887 | A1 | 12/2008 | Pizzi | |
| 2009/0063345 | A1* | 3/2009 | Erikson | G06Q 20/10 705/44 |
| 2009/0070411 | A1 | 3/2009 | Chang | |
| 2009/0089176 | A1 | 4/2009 | McCabe | |
| 2009/0119209 | A1 | 5/2009 | Sorensen | |
| 2009/0132392 | A1 | 5/2009 | Davis | |
| 2009/0234751 | A1 | 9/2009 | Chan | |
| 2010/0088225 | A1 | 4/2010 | Forsberg | |
| 2010/0179907 | A1 | 7/2010 | Atkinson | |
| 2010/0180032 | A1* | 7/2010 | Lunt | H04L 51/12 709/225 |
| 2010/0180339 | A1* | 7/2010 | Finlayson | G06F 21/604 726/21 |
| 2010/0251353 | A1* | 9/2010 | Hodgkinson | G06F 21/34 726/9 |
| 2010/0280946 | A1* | 11/2010 | Batten | G06Q 20/02 705/42 |
| 2011/0072039 | A1* | 3/2011 | Tayloe | G06F 21/6218 707/769 |
| 2011/0209200 | A2* | 8/2011 | White | G06F 21/32 726/4 |
| 2011/0276590 | A1* | 11/2011 | Hayes | G06Q 10/107 707/769 |
| 2011/0307381 | A1* | 12/2011 | Kim | G06Q 20/027 705/44 |
| 2011/0307388 | A1* | 12/2011 | Kim | G06Q 20/12 705/67 |
| 2012/0041879 | A1* | 2/2012 | Kim | G06Q 20/40 705/44 |
| 2012/0110642 | A1* | 5/2012 | Grassel | G06Q 10/101 726/4 |
| 2012/0295580 | A1* | 11/2012 | Corner | G07F 19/20 455/405 |
| 2012/0300938 | A1* | 11/2012 | Kean | H04L 9/3234 380/279 |
| 2013/0007845 | A1* | 1/2013 | Chang | G06F 21/62 726/4 |
| 2013/0013553 | A1* | 1/2013 | Stibel | G06Q 10/107 707/602 |
| 2013/0239195 | A1* | 9/2013 | Turgeman | G06F 21/316 726/7 |
| 2013/0346302 | A1* | 12/2013 | Purves | G06Q 20/102 705/40 |
| 2014/0100203 | A1 | 4/2014 | Ortiz | |
| 2014/0108263 | A1* | 4/2014 | Ortiz | G06Q 20/3278 705/71 |
| 2014/0129448 | A1* | 5/2014 | Aiglstorfer | G06Q 20/3223 705/44 |
| 2014/0143837 | A1* | 5/2014 | Fletcher | H04L 63/105 726/4 |
| 2014/0373126 | A1* | 12/2014 | Hussain | H04L 63/08 726/9 |
| 2016/0358210 | A1* | 12/2016 | O'Toole | H04L 67/02 |

\* cited by examiner

CLOUD-BASED SYSTEM AND METHODS FOR PROVIDING CONSUMER FINANCIAL DATA

CROSS REFERENCE TO RELATED APPLICATIONS

This application is a continuation of U.S. patent application Ser. No. 14/071,869, filed Nov. 5, 2013, now allowed, which claims the benefit of priority of U.S. Provisional Application No. 61/722,626, filed Nov. 5, 2012, and U.S. Provisional Application No. 61/722,939, filed Nov. 6, 2012, the disclosures of which are expressly incorporated herein by reference in their entirety.

The present application also relates to U.S. patent application Ser. No. 14/072,133, entitled "Systems and Methods for Providing Financial Service Extensions," filed Nov 5, 2013, which is expressly incorporated herein by reference in its entirety.

BACKGROUND

I. Technical Field

The present disclosure generally relates to financial services and transactions enabled on a mobile phone or device. In particular, the present disclosure relates to systems and methods for facilitating mobile banking and commerce, and for authenticating and sharing data with external, third party services and applications over a network.

II. Background Information

Consumers use mobile devices (such as tablets and smartphones) for a variety of purposes. More recently, consumers have begun to increase their use of mobile devices to access their banking and financial information. On a variety of handheld mobile devices, consumers can download "banking apps." Consumers can download these "apps" (short for "applications") from various mobile software distribution platforms, such as from the Apple® iTunes® App Store™ or the Google® Play® Marketplace store. Alternatively, consumers can use web applications delivered over HTTPS, which use either server-side or client-side processing to provide a banking experience within a browser on mobile devices. Typical banking application features include, for example, the ability to view recent transactions and account balances; receive account related alerts; automatically pay bills; transfer funds between accounts; and search for branch and ATM locations.

While these banking applications are becoming more popular with consumers, the market demand is for more extensive and useful banking and financial services, and other customer offerings. A wide array of financial applications can provide value to the mobile device user, regardless of whether the user is a business or a consumer.

However, in the universe of mobile financial services, one of the greatest challenges to achieve is encouraging users to sign up for a new service or application. For example, the sign up process often requires users to download a mobile application, create new credentials, and transfer funds from a financial service account into an account associated with the new service.

What is needed therefore in the field is a straightforward system and method for third party applications or services to be able to automatically access a consumer's banking information, especially when a third party application is provisioned and provided access to a consumer from a common mobile banking platform. At the same time, it would be equally beneficial for a system managing the user's financial information to authenticate a third party application or service prior to the sharing of a user's financial information.

SUMMARY

Consistent with a disclosed embodiment, a system is provided for providing cloud-based access to consumer financial data. The system may receive a notification from a server, the notification comprising a request to access consumer data associated with a financial service account. Also, the system may determine that a financial service account provider has authorized access by the server to the consumer data. The system may further determine that one or more consumers associated with the financial service account provider authorize access by the server to the consumer data. The system may configure a software object identifying the server and at least a portion of the consumer data that the server is authorized to access. Additionally, the system may receive a notification from the server, the notification comprising a request to access authorized consumer data. The system may verify the configured software object, and provide to the server access to the authorized consumer data.

Consistent with a disclosed embodiment, a computer-implemented method is provided for providing cloud-based access to consumer financial data. The method comprises receiving a notification from a server, the notification comprising a request to access consumer data associated with a financial service account. Also, the method includes determining that a financial service account provider authorizes access by the server to the consumer data. The method further comprises determining that one or more consumers associated with the financial service account provider authorize access by the server to the consumer data. Further, the method includes configuring a software object identifying the server and at least a portion of the consumer data that the server is authorized to access. Additionally, the method comprises receiving a notification from the server, the notification comprising a request to access authorized consumer data. The method comprises verifying the configured software object, and providing to the server access to the authorized consumer data.

Consistent with other disclosed embodiments, non-transitory computer-readable storage media may store program instructions, which are executed by a processor and perform any of the methods described herein.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
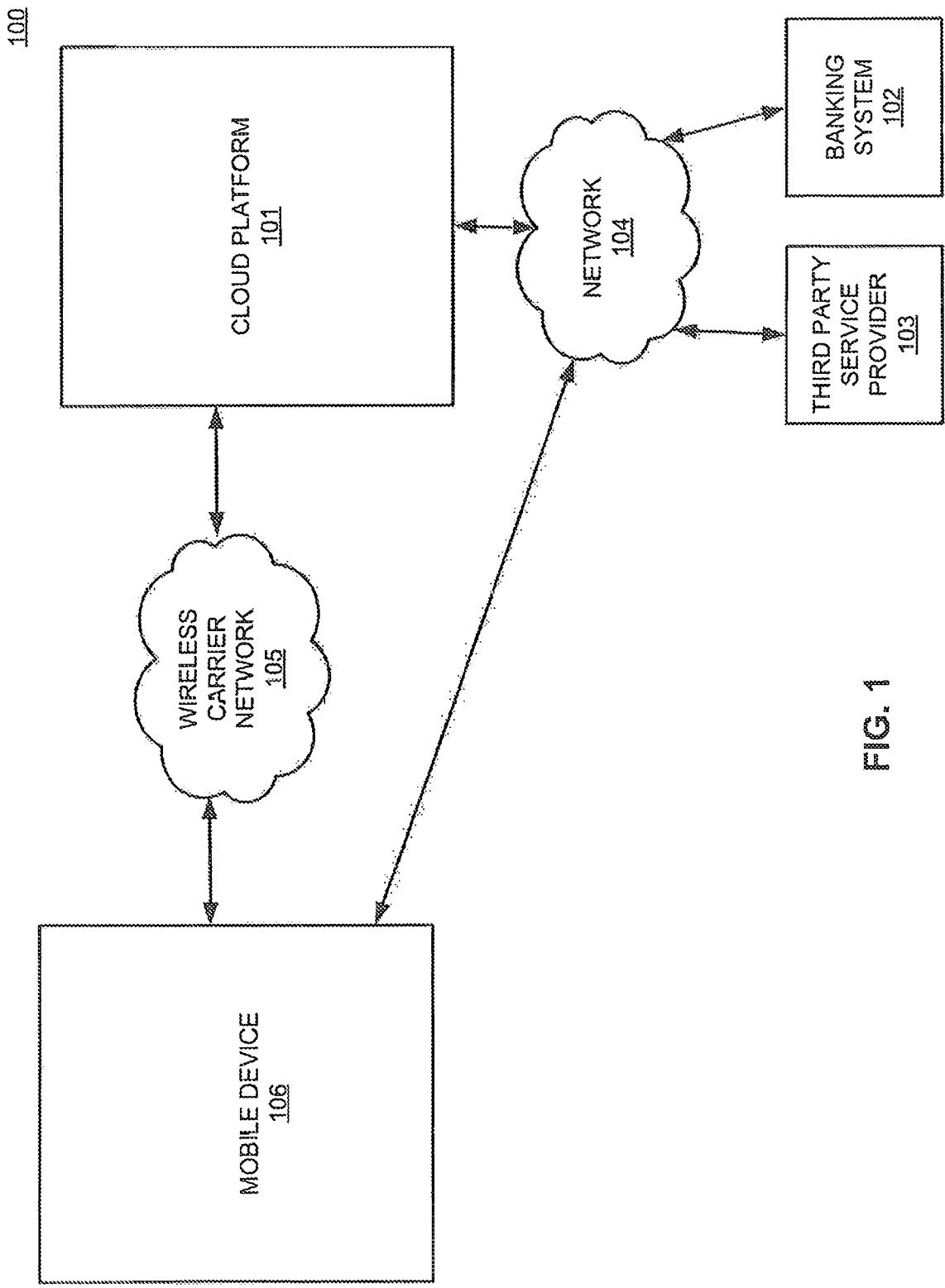
FIG. 1 is an example of a system for providing cloud-based access to consumer financial data, consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limiting of the disclosed embodiments. Instead, the proper scope is defined by the appended claims.

Disclosed embodiments provide systems and methods for providing cloud-based access to consumer financial data, for example, to third party service providers seeking to provide mobile services through mobile applications. The mobile applications may provide access to consumer financial data or functions related to financial services. A cloud-based platform, after receiving a data access request from a third party service provider, may determine that the third party service provider is authorized and provisioned by both the consumer and an associated financial service account provider. For example, the cloud-based platform may configure a software object (e.g., a token) providing limited access to the specific consumer financial data and functions that the third party service provider is authorized to access. After the cloud-based platform receives and verifies the software object provided by the third party service provider, the cloud-based platform may authorize the third party service provider to access the specified consumer financial data via the cloud.

FIG. 1 is an example of a system 100 for providing financial services over a secure network infrastructure, consistent with a disclosed embodiment. System 100 may be configured to perform one or more software processes that, when executed, provide one or more aspects of the disclosed embodiments. The components and arrangement shown in FIG. 1 is not intended to be limiting to the disclosed embodiment as the components used to implement the processes and features disclosed here may vary.

In accordance with a disclosed embodiment, system 100 includes a cloud platform 101, a banking system 102, a third party service provider 103, and a mobile device 106 configured to communicate over a network, which may include network 104 and wireless carrier network 105. For example, mobile device 106 may communicate over wireless carrier network 105, and may also communicate over network 104 (e.g., via a Wi-Fi connection). Other components known to one of ordinary skill in the art may be included in system 100 to process, transmit, provide, and receive information consistent with the disclosed embodiments. For example, in addition to or in place of mobile device 106, one or more other client devices (e.g., desktop computer, laptop computer, etc.) may be included to communicate with the components of system 100.

Cloud platform 101 may be a computer-based system including computer system components, such as one or more servers, desktop computers, workstations, tablets, hand held computing devices, memory devices, and/or internal network(s) connecting the components. In one embodiment, cloud platform 101 may be a server that includes one or more processor(s), memory devices, and interface components configured to provide a cloud-based service. As used in this disclosure, services, processes, or applications that are "cloud-based" refer to scalable, distributed execution of one or more software processes over a network using real or virtual server hardware. Cloud platform 101 may be a single server or a distributed computer system including multiple servers or computers that interoperate to perform one or more of the processes and functionalities associated with the disclosed embodiments.

In some embodiments, cloud platform 101 may be a server that is associated with a financial institution. The financial institution may be, for example, a bank, lender, merchant, credit card provider, or any other entity that provides financial accounts to customers. The financial institution may manage cloud platform 101 such that cloud platform 101 may be used to perform financial services. In some embodiments, the financial institution may be the same institution that is associated with banking system 102. In other embodiments, the financial institution may be a different institution than that associated with banking system 102. In alternative embodiments, cloud platform 101 may be hosted and managed by an entity other than a financial institution, such as a network service provider, internet service provider, telecommunications firm, etc. These entities may execute business agreements with financial institutions enabling them to manage financial data via cloud platform 101.

Banking system 102 may be a computer-based system associated with a financial Institution, such as a bank, credit union, credit card issuer, or other type of financial service entity that generates, provides, manages, and/or maintains financial service accounts. Financial service accounts may include, for example, credit card accounts, checking accounts, savings accounts, loan accounts, reward accounts, and any other types of financial service account. Financial service accounts may be associated with electronic accounts, such as a digital wallet or similar account that may be used to perform electronic transactions, such as purchasing goods and/or services online. Financial service accounts may also be associated with physical financial service account cards, such as a credit or check card that a user may carry on their person and use to perform financial service transactions, such as purchasing goods and/or services at a point of sale (POS) terminal. Banking system 102 may include infrastructure and components that are configured to generate and provide financial service accounts and financial service account cards (e.g., credit cards, check cards, etc.). Banking system 102 may also include infrastructures and components that are configured to store financial data associated with the financial service accounts.

In embodiments in which cloud platform 101 is also associated with a financial Institution, banking system 102 may be associated with the same or a different financial institution. In certain embodiments in which cloud platform 101 and banking system 102 are associated with the same financial institution, cloud platform 101 may be an integrated component of banking system 102. For example, banking system 102 may be an overall computing system associated with a financial institution, with cloud platform 101 being a component thereof.

Third party service provider 103 may be a computer-based system associated with a third party. For example, third party service provider 103 may be associated with a merchant configured to provide one or more services to consumers. Third party service provider 103 may include one or more computing systems that are configured to perform computer-implemented processes, such as a server, desktop, laptop, mobile device, etc.

Banking system 102 and third party service provider 103 may be configured to communicate with cloud platform 101 via network 104. Network 104 may be any type of network that provides communications, exchanges information, and/or facilitates the exchange of information between cloud platform 101 and other components of system 100, such as banking system 102, third party service provider 103, and/or mobile device 106. In one embodiment, network 104 may be the Internet, or any other suitable connection(s) that enables system 100 to send and receive information between the components of system 100. In other embodiments, one or more components of system 100 may communicate directly through a dedicated communication link(s) (not shown), such as a link between cloud platform 101 and banking system 102.

In some embodiments, cloud platform 101 may communicate with banking system 102 and/or third party service provider 103 through one or more application programming interfaces (APIs). The one or more APIs may be configured to allow for the transmission and receipt of data between components, according to one or more processes associated with the provision of a particular service. For example, a peer-to-peer (P2P) transfer API between cloud platform 101 and third party service provider 103 may allow for sharing and processing of particular data associated with completion of a P2P transfer, such as a transfer of money from one consumer's account to another consumer's account.

Mobile device 106 may be a client device in the form of one or more mobile. computer-based systems. For example, mobile device 106 may be a tablet or smartphone. In alternative embodiments, another client device, such as a desktop computer, laptop computer, tablet computer, server, point of sale device, kiosk, ATM, or the like, may be included in system 100 in place of or in addition to mobile device 106 and perform some or all of the functions of mobile device 106. In an exemplary embodiment, mobile device 106 may be associated with a consumer that maintains one or more financial accounts with a financial institution associated with cloud platform 101, banking system 102, and/or third party service provider 103.

In an exemplary embodiment, mobile device 106 may be a device that receives, stores, and/or executes mobile applications. Mobile device 106 may be configured with storage that stores one or more operating systems that perform known operating system functions when executed by one or more processors, such as one or more software processes configured to be executed to run a mobile application.

Mobile device 106 may also include communication software that, when executed by a processor, provides communications with network 104 and wireless carrier network 105, such as Web browser software, tablet or smart hand held device networking software, etc. In some embodiments, mobile device 106 may be configured to communicate with banking system 102 and/or third party service provider 103 via network 104 and/or wireless carrier network 105. In these embodiments, banking system 102 and/or third party service provider 103 may be authorized to execute one or more software processes on mobile device 106 via network 104 and/or wireless carrier network 105, such as a mobile application or a web applet. Wireless carrier network 105 may be a data service network configured to provide communications, exchange information, and/or facilitate the exchange of information between components of system 100. It should be understood, however, that wireless carrier network 105 may be any network configured to perform these functions. In certain embodiments, wireless carrier network 105 and network 104 may be the same or otherwise related networks.

In an exemplary embodiment, system 100 may use infrastructures and components, such as banking system 102 and third party service provider 103 and integrate them into cloud platform 101, which becomes a point of entry, and facilitates the integration of banking and third party services such that they are made available to mobile device 106 through communication with cloud platform 101. In other embodiments, cloud platform 101 may provide information and access enabling banking system 102 and third party service provider 103 to provide the services directly to mobile device 106 via network 104.

Figure 2:
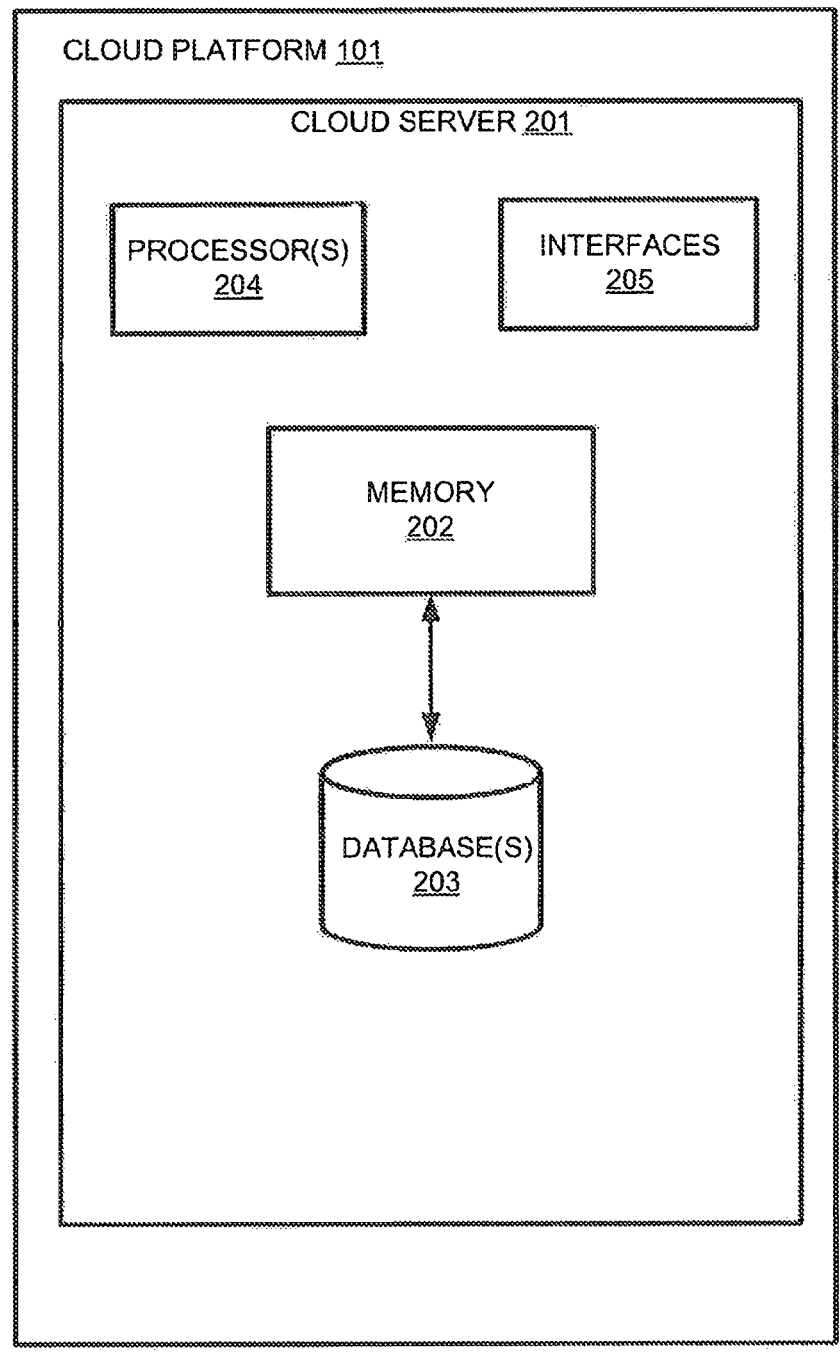
FIG. 2 is an example of a cloud-based data platform, consistent with disclosed embodiments.

FIG. 2 further depicts cloud platform 101. Cloud platform 101 may include a cloud server 201. Cloud server 201 may include one or more memories 202, one or more databases 203, one or more processors 204, and one or more interfaces 205. Cloud server 201 may take the form of a general purpose computer, a mainframe computer, a mobile computing device, or any combination of these components. According to some embodiments, cloud server 201 may include a web server or similar computing device that generates, maintains, and provides one or more web sites or similar services, consistent with disclosed embodiments. Cloud server 201 may be standalone, or it may be part of a subsystem, which may be part of a larger system. For example, cloud server 201 may represent distributed servers that are remotely located and communicate over a network (e.g., network 140) or a dedicated network, such as a LAN. In some embodiments, one or more of banking system 102, third party service provider 103, and mobile device 106 may include the components and/or configuration of cloud platform 101 and/or cloud server 201. It should be understood that the illustrated system architecture described herein associated with cloud platform 101 is presented as a non-limiting example only, and that any other system configuration operable to perform the disclosed embodiments is possible.

Memory 202 may Include one or more storage devices configured to store instructions used by processor 204 to perform functions related to disclosed embodiments. For example, memory 202 may be configured with one or more software instructions that may perform one or more operations when executed by processor 204. The disclosed embodiments are not limited to separate programs or computers configured to perform dedicated tasks. For example, memory 202 may include a single program that performs the functions of server 201 or a program could comprise multiple programs. Additionally, processor 204 may execute one or more programs located remotely from cloud server 201. For example, banking system 102, third party service provider 103, and/or mobile device 106 may, via cloud server 201, access one or more remote programs that, when executed, perform functions related to certain disclosed embodiments. Memory 202 may also store data that may reflect any type of information in any format that the system may use to perform operations consistent with the disclosed embodiments.

Cloud server 201 may be communicatively connected to database(s) 203 (e.g., via network 104) or database 203 may be an integrated component of cloud platform 101 and/or cloud server 201. Database 203 may include one or more memory devices that store information and are accessed and/or managed through cloud server 201. By way of example, database(s) 203 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Database 203 may include computing components (e.g., database management system, database server, etc.) configured to receive and process requests for data stored in memory devices of database(s) 203 and to provide data from database(s) 203.

Processor(s) 204 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in cloud server 201.

Interfaces 205 may be one or more devices configured to allow data to be received and/or transmitted by cloud server 201. Interfaces 205 may include one or more digital and/or analog communication devices that allow cloud server 201 to communicate with other machines and devices, such as other components of system 100.

Figure 3:
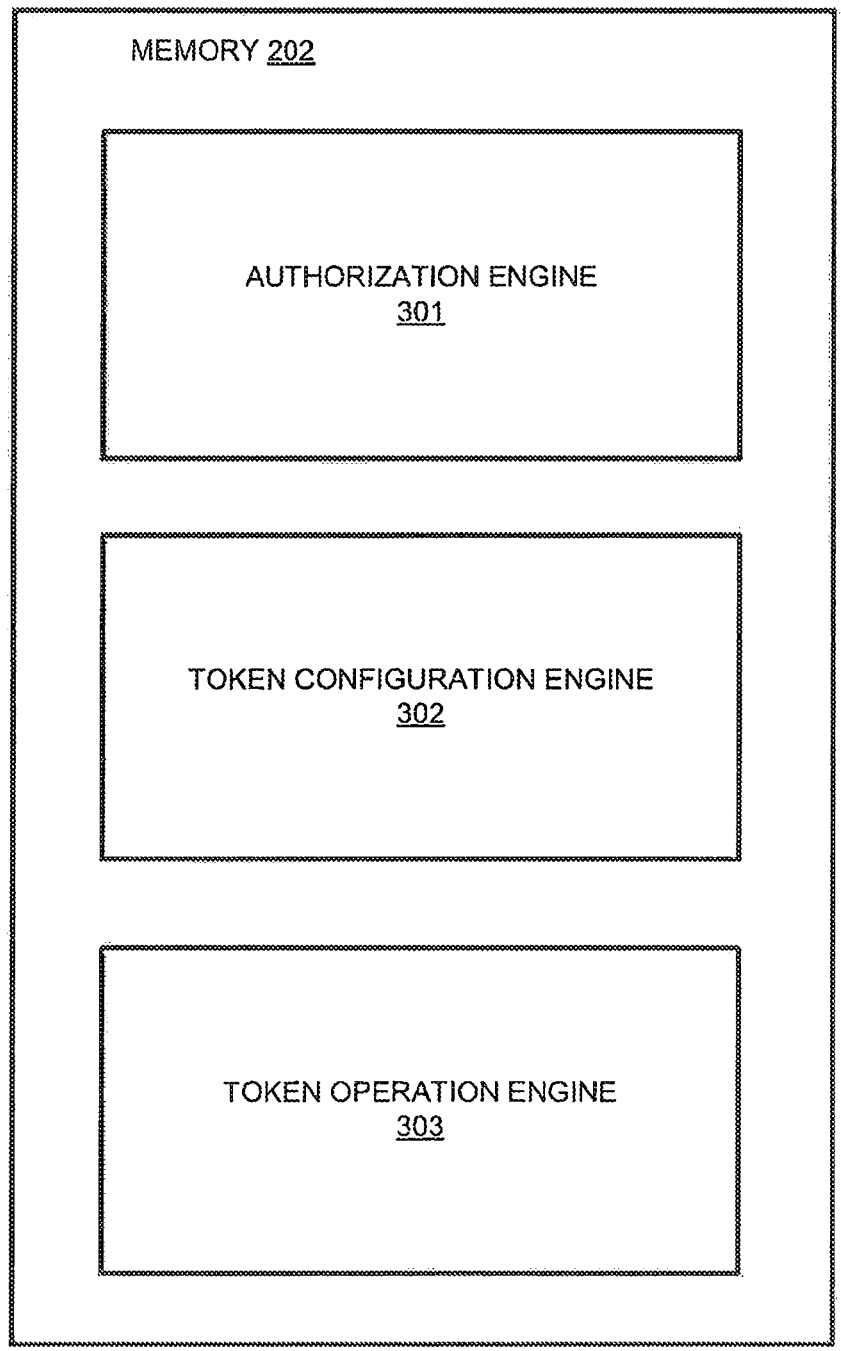
FIG. 3 is an example of a memory contained within a cloud-based data platform, consistent with disclosed embodiments.

FIG. 3 is a block diagram of memory 202. In addition to the structures and functions described previously in connection with FIG. 2, memory 202 may contain one or more dedicated software modules configured to perform the disclosed embodiments. In one embodiment, these modules may include an authorization engine 301, a token configuration engine 302, and a token operation engine 303.

Authorization engine 301 may be configured to perform processes associated with the provisioning and authorization of third party service providers (such as third party service provider 103), applications, and services. An exemplary third party authorization process 520 is described below in association with FIGS. 5 and 6.

Token configuration engine 302 may be configured to perform processes associated with generating, programming, and deploying secure software objects, or "tokens," to third party service providers (such as third party service provider 103) for purposes of identification, verification, and access to authorized consumer financial data. An exemplary token configuration process 530 is described below in association with FIGS. 5 and 7.

Token operation engine 303 may be configured to perform processes associated with recognizing and verifying third party tokens, such as those configured by token configuration engine 302. Token operation engine 303 may be further configured to determine consumer financial data authorized for access by a third party bearing the token. An exemplary token operation process 540 is described below in association with FIGS. 5 and 8.

Figure 4:
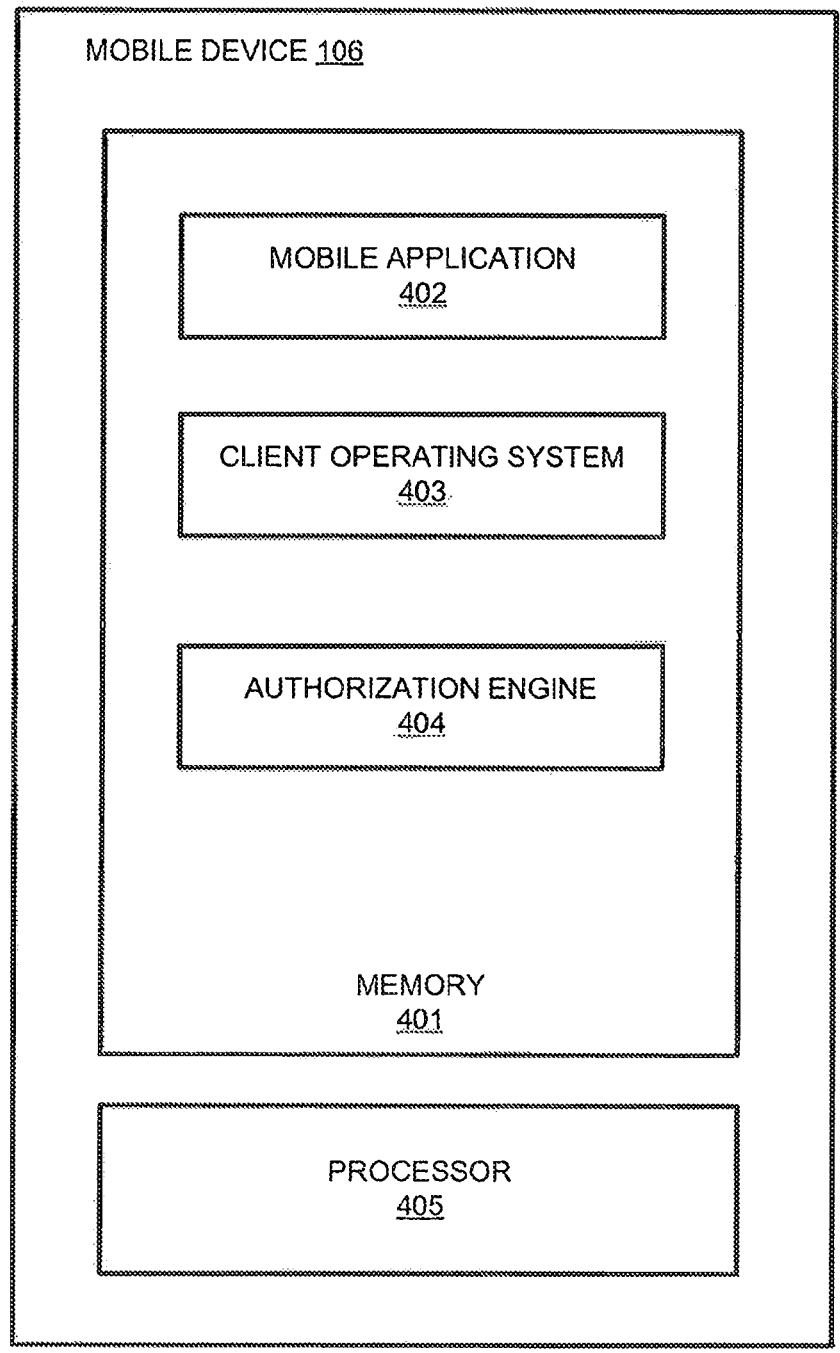
FIG. 4 is an example of a mobile device, consistent with disclosed embodiments.

FIG. 4 is a block diagram of mobile device 106. Mobile device 106 may comprise a memory 401 and one or more processor(s) 405. Memory 401 may Include instructions to enable processor(s) 405 to execute one or more applications, such as server applications, network communication processes, and any other type of application or software known to be available on computer systems.

In one embodiment, memory 401 includes instructions that, when executed by processor(s) 405, perform one or more processes consistent with the functionalities disclosed herein. Methods, systems, and articles of manufacture consistent with disclosed embodiments are not limited to separate programs or computers configured to perform dedicated tasks. Moreover, processor(s) 405 may execute one or more programs from remote resources. For example, components of financial services system 100 may access one or more remote programs, that, when executed, perform functions related to disclosed embodiments.

Memory 401 may include a mobile application 402, a client operating system 403, and an authorization engine 404. Mobile application 402 may be any software object configured to perform a service or process when executed by processor 405. Mobile application 402 may be associated with one or more entities, such as cloud platform 101, banking system 102, third party service provider 103, combinations of these entities, or other entities. In some embodiments, mobile application 402 may be a financial application that allows a user of mobile device 106 to access and control various financial service accounts, such as those associated with banking system 102. In other embodiments, mobile application 402 may be another type of application providing access to financial data including, but not limited to, an auction application, a trading application, a game, an application for viewing various media (e.g., television shows, movies, music videos, etc.), or a "wallet" application for making in-person purchases at a point of sale. This list is not intended to be limiting, and one skilled in the art may conceive of any number of software applications hosted on a mobile device that could incorporate access to consumer financial data.

Client operating system 403 may be a software object or associated series of software objects that provide a graphical user interface to interact with other software contained in memory 401, such as one or more mobile applications 402. Examples of client operating systems 403 include, for example, Apple® iOS®, Google® Android®, Microsoft® Windows Mobile®, etc. Client operating system 403 may be pre-loaded onto mobile device 106 by the device manufacturer or may be installed by the user.

Authorization engine 404 may be configured to perform processes associated with the provisioning and authorization of third party service providers (such as third party service provider 103), applications, and services. Authorization engine 404 may be configured to interact and communicate with authorization engine 301 of cloud platform 101 via wireless carrier network 105. Authorization engine 404 may assist in execution of various processes to authorize and provision third party service providers, such as third party service provider 103, which may then provide services via one or more mobile applications, such as mobile application 402. An exemplary third party authorization process 520 is described below in association with FIGS. 5 and 6. It should be understood that the illustrated structure of mobile device 106 described herein is presented as a non-limiting example only, and that any other configuration operable to perform the disclosed embodiments is possible. As discussed above, in some embodiments, another client device such as a desktop computer, laptop computer, tablet computer, server, point of sale device, kiosk, ATM, or the like, may be included in system 100 in place of or in addition to mobile device 106 and perform some or all of the functions of mobile device 106.

Figure 5:
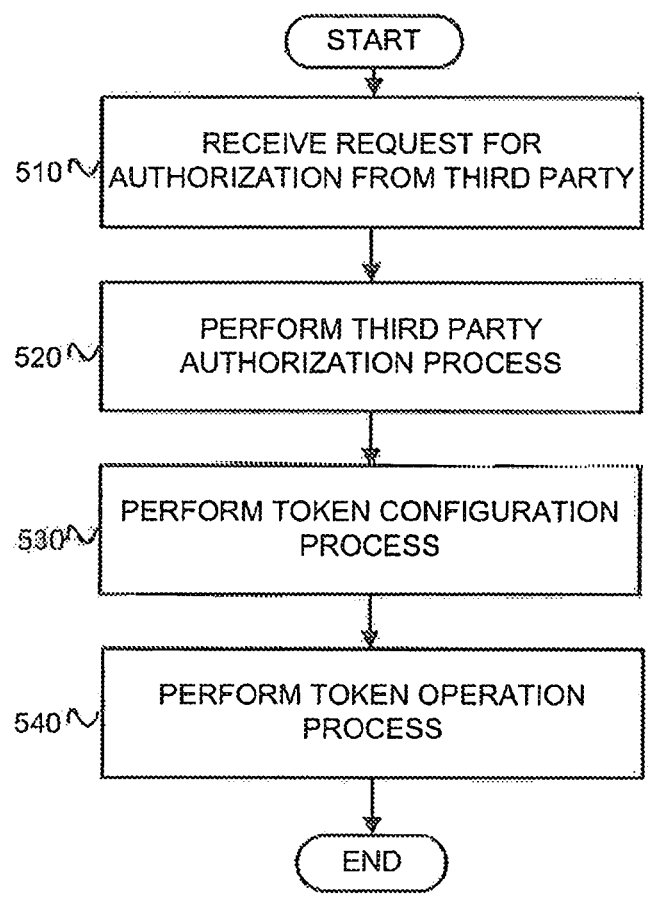
FIG. 5 is an example of a process for providing cloud-based access to consumer financial data, consistent with disclosed embodiments.

FIG. 5 illustrates a consumer financial data access process 500 consistent with certain disclosed embodiments. Process 500, as well as any or all of the individual steps therein, may be performed by any one or more of cloud platform 101, banking system 102, third party service provider 103, or mobile device 106. For exemplary purposes, process 500 is described as being performed by cloud platform 101.

In a preferred embodiment, authentication information passed from a third party, such as third party service provider 103, to cloud platform 101 includes information as to whether or not the third party service has been previously authorized by a consumer to access that consumer's financial information. Once it has been established that the third party service is authorized to access the consumer's financial Information, the consumer's financial data, including banking or credit card account information, may be used to initiate and complete a third party transaction initiated from the third party service.

Cloud platform 101 may receive a request for authorization to access consumer financial data via authorization engine 301 from a third party, such as third party service provider 103 (Step 510). The request may be received via network 104, or by other methods, such as by telephone or by postal mail. In some embodiments, the request may contain various information, including but not limited to information identifying the third party, information identifying or exemplifying an application or service that the third party seeks to provide, or information identifying the amount or types of consumer financial data that the third party seeks to access for purposes of providing the application or service.

In some embodiments, cloud platform 101 may deny or otherwise decline to act on the third party request. In these embodiments, third party service provider 103 may have the option to transmit the request to a different cloud platform or similar service provider, or may alternatively alter their request and re-submit it to cloud platform 101. In some embodiments, cloud platform 101 may agree to assist third party service provider 103, and the two parties may enter into a business relationship. In these embodiments, cloud platform 101 may make the business relationship itself or terms and conditions of the relationship contingent upon third party service provider 103 meeting one or more predetermined criteria. For example, in some embodiments, cloud platform 101 may conduct an investigation or other background check into third party service provider 103 and/or individuals associated with it. In other embodiments, cloud platform 101 may insist upon undertaking technical configuration of computing systems associated with third party service provider 103 to ensure compatibility with other components of system 100 and to establish a trusted relationship with third party service provider 103.

As part of the trusted business relationship between cloud platform 101 and third party service provider 103, cloud platform 101 may perform a third party authorization process, such as is disclosed below in connection with FIG. 6 (Step 520). In brief, according to some embodiments, cloud platform 101 (via authorization engine 301) may determine if a financial service account provider, such as banking system 102, authorizes access to consumer financial data by the trusted third party, such as third party service provider 103. If the financial service account provider authorizes access, cloud platform 101 may identify consumers relevant to the third party request, and may determine if those consumers individually authorize access by the third party to their consumer financial data. If the consumers also authorize access, cloud platform 101 may configure an access token for the third party. If either the financial service account provider or the individual consumer declines authorization of the third party, cloud platform 101 denies the third party access to the consumer financial data.

Cloud platform 101 may next perform a token configuration process, such as is disclosed below in connection with FIG. 7 (Step 530). In brief, according to some embodiments, cloud platform 101 (via token configuration engine 302) may configure a digital certificate for secure access to consumer financial data by the authorized third party. In some embodiments, the digital certificate may be configured using Secure Sockets Layer (SSL) technology. Cloud platform 101 may determine financial data and functions associated with the authorizing banking system 102, then determine a subset of the data and functions associated with the authorizing consumers. Within the consumer data and function set, token configuration engine 302 may determine the particular subset of data and functions that the consumer has authorized the third party to access. Engine 302 may then configure a token providing the third party access to the authorized consumer financial data.

Cloud platform 101 may perform a token operation process, such as is disclosed below in connection with FIG. 8 (Step 540). In brief, according to some embodiments, cloud platform 101 (via token operation engine 303) may receive a request for access to consumer financial data by a third party, such as third party service provider 103. Token operation engine 303 may confirm that the third party is an authorized party, then request, receive, and verify the third party's previously configured digital certificate. Engine 303 may read or execute software instructions stored within the third party token to determine what, if any, consumer financial data that the third party may access for any given consumer, and then provide the third party with the authorized consumer data.

Figure 6:
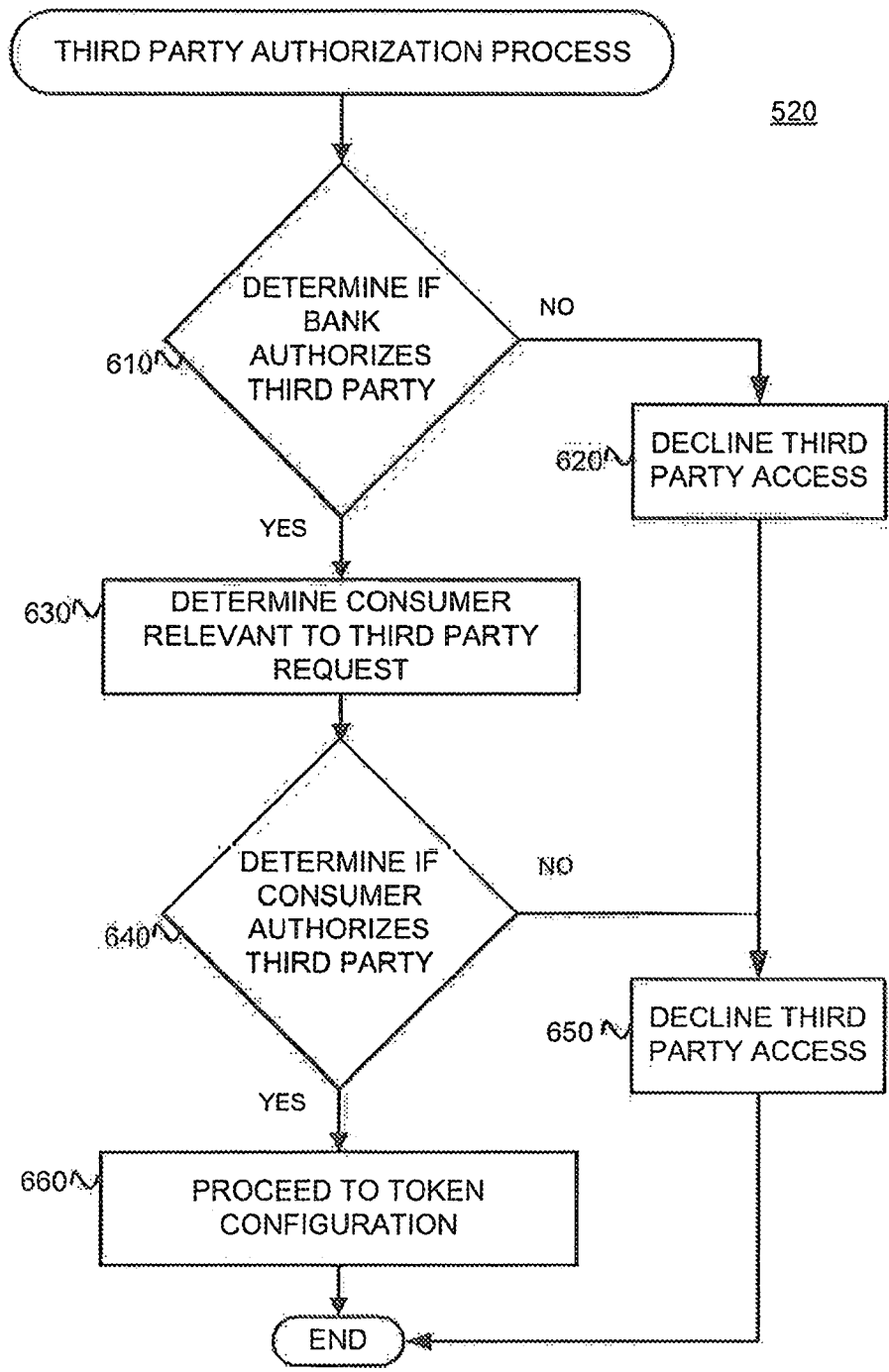
FIG. 6 is an example of a third party authorization process, consistent with disclosed embodiments.

FIG. 6 illustrates a third party authorization process (corresponding to Step 520 of process 500 disclosed above) consistent with certain disclosed embodiments. Process 520, as well as any or all of the individual steps therein, may be performed by any one or more of cloud platform 101, banking system 102, third party service provider 103, or mobile device 106. For exemplary purposes, FIG. 6 is described as being performed by cloud platform 101.

As will be understood by those skilled in the art, there may be multiple ways of establishing a trusted relationship with a third party service, such as exchange of tokens or passing certain authentication information from third party service provider 103 and cloud platform 101. By creating a trusted relationship, third party service provider 103 may be able to access one or more restricted functional modules, data, libraries or other services within cloud platform 101 not accessible by a untrusted third party. For example, third party service provider 103 may access certain secure and private consumer data and information.

In one embodiment, cloud platform 101, via authorization engine 301, may determine if a financial service account provider, such as a provider associated with banking system 102, authorizes and authenticates a third party, such as third party service provider 103 (Step 610). Authorization engine 301 may make the determination by transmitting the third party request to banking system 102 via network 104, or by other means. In some embodiments, authorization engine 301 may provide banking system 102 with information about the third party service provider 103 that is seeking authorization, such as identifying information, information about proposed third party services and/or applications, information about types of consumer financial data requested, etc. This list is not intended to be limiting and authorization engine 301 may provide more or less information for any particular third party.

If the financial service account provider does not authorize and authenticate the third party (Step 610: NO), then authorization engine 301 declines the third party authorization request (Step 620). Conversely, if banking system 102 does indicate that the third party is authorized and authenticated (Step 610: YES), then authorization engine 301 proceeds and determines particular consumers associated with the financial service account provider (Step 630). In some embodiments, the consumers may be existing customers of the financial service account provider, and the financial service account provider may have previously configured a financial service account for the consumers. In other embodiments, banking system 102 may have acquired the consumers' financial data via other means.

Cloud platform 101, via authorization engine 301, may determine if the individual consumers authorize and authenticate the third party (Step 640). Authorization engine 301 may make the determination by transmitting the third party request to mobile device 106 via wireless carrier network 105, or by other means. In some embodiments, authorization engine 301 may provide the consumer(s) with Information about the third party service provider 103 that is seeking authorization, such as identifying information, information about proposed third party services and/or applications, information about types of consumer financial data requested, etc. This list is not intended to be limiting and authorization engine 301 may provide any appropriate information for any particular third party.

If the consumer does not authorize and authenticate the third party (Step 640: NO), then authorization engine 301 declines the third party authorization request (Step 650). Conversely, if the consumer does indicate that the third party is authorized and authenticated (Step 640: YES), for example, through mobile application 402 or by an electronic mail message, then authorization engine 301 proceeds to begin configuration of an access token allowing the third party access to financial data (Step 660).

In some embodiments, authorization engine 301 may be configured to permit one or more of the financial service account provider associated with banking system 102 and/or the consumer to revoke any authorization or "provisioning" granted to the third party as part of process 520 at any time after the authorization. In these embodiments, authorization engine 301 and other components of cloud platform 101 and cloud server 201 as illustrated in FIG. 2 may be capable of instantaneously disabling any and all access by the third party to financial data associated with an individual consumer or to any data associated with banking system 102 as a whole.

Figure 7:
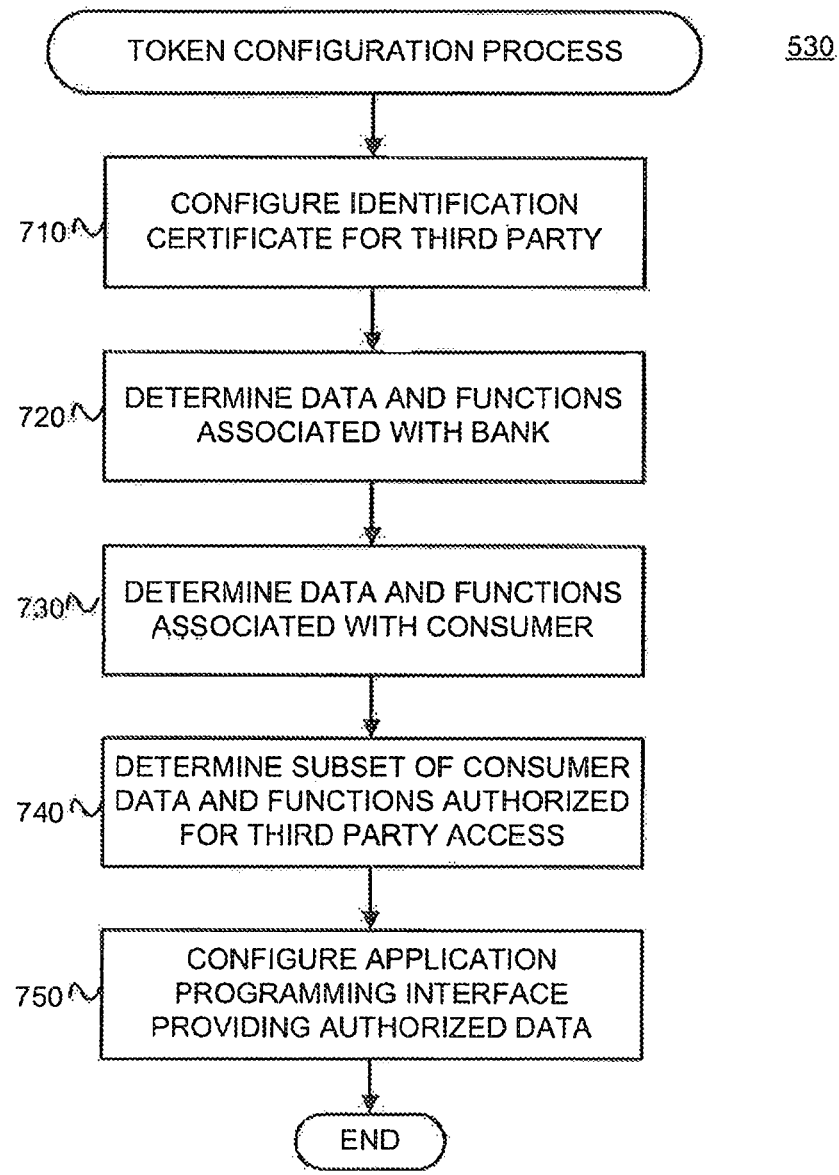
FIG. 7 is an example of a token configuration process, consistent with disclosed embodiments.

FIG. 7 illustrates a token configuration process (corresponding to Step 530 of process 500 disclosed above) consistent with certain disclosed embodiments. Process 530, as well as any or all of the individual steps therein, may be performed by any one or more of cloud platform 101, banking system 102, third party service provider 103, or mobile device 106. For exemplary purposes, FIG. 7 is described as being performed by cloud platform 101.

Cloud platform 101, via token configuration engine 302, may configure a digital certificate for the authorized third party (Step 710). The purpose of the certificate is to identify the third party and provide enhanced security for consumer data. In some embodiments, the digital certificate may be initially configured at the onset of a trusted business relationship between cloud platform 101 and third party service provider 103. The certificate and the identification information comprising it may be updated at any time after its initial configuration. As part of a "handshake" over network 104 between cloud platform 101 and third party service provider 103, cloud platform 101 may require that the third party provide a secure certificate to verify their identity and their "trusted" status. In some embodiments, cloud platform 101 may be capable of revoking the digital certificate of any third party service provider 103, denying them access to any consumer financial data, financial institution data, or other information and services hosted by cloud platform 101. Although in preferred embodiments the verification is achieved via a certificate configured using SSL technology, it is understood that token configuration engine 302 may employ any like technology providing secure verification of identity.

Token configuration engine 302 may determine one or more banking functions and data associated with a particular financial service account provider, such as that associated with banking system 102 (Step 720). Examples of banking functions and data that may be associated with a financial services account may include, but are not limited to, the credit score of the consumer, or demographic information associated with the consumer, recent transactions and account balances, configuring account-related alerts, configuring automatic bill payment, transferring funds between accounts, transferring funds to external systems, and locating associated service provider locations. It is understood the foregoing data and functions are exemplary, and that any particular banking system 102 may be capable of providing more or fewer functions and data. Token configuration engine 302 may parse the information using processor 204, and may store the information in memory 202 or database 203.

Within the identified banking functions and data, token configuration engine 302 may determine a subset of the data and functions associated with the consumers that the third party desires to target with services or offers (Step 730). For example, token configuration engine 302 may be configured to access and scan financial service accounts and/or data associated with the consumers, and determine which functions and data are present in each individual consumer's account within banking system 102. Token configuration engine 302 may parse the accounts using processor 204, and may store the information relating to the associated functions and/or data in memory 202 or database 203.

Next, token configuration engine 302 may determine a further subset of consumer data and/or functions that the third party, such as third party service provider 103, is authorized to access (Step 740). Token configuration engine 302 may be configured to communicate directly with authorization engine 301 to determine the authorized data and/or functions authorized by both the financial service account provider and the individual consumer (for example, during authorization process 520). Alternatively, token configuration engine 302 may determine the authorized data and/or functions from information stored in memory 202 and/or database 203.

Token configuration engine 302 may configure a software object, such as an application programming interface, relating to the financial information authorized for access in the processes described previously (Step 750). The software object (e.g., a "token") may be configured to inform components of system 100, such as cloud platform 101, what data and/or functions that banking system 102 and individual consumers have authorized third party service provider 103 to access.

In some embodiments, the token may contain various categories or arrangements of the possible consumer financial data or functions that the third party could potentially access, along with an indication of whether or not third party service provider 103 is actually authorized to access the data. For example, a consumer's financial service account hosted on banking system 102 may be configured to transfer funds between accounts, transfer funds to external systems, show account balances, and set up recurring payments. In one embodiment, a particular third party service provider 103 may be authorized to access certain information (e.g., only the account balances), and token configuration engine 302 may configure the token for that particular third party service provider 103 to reflect that authorization status. In some embodiments, a particular third party may be "preferred" by one or more of the consumer or the financial service provider, and may thus be authorized to access more data. For example, in the scenario discussed above, one service provider might only be able to access the account balances of a consumer, while a "preferred" third party service provider might be able to access the funds transfer and recurring payment functions as well as the account balances. In these embodiments, the various tokens for each service provider are configured by token configuration engine 302 to reflect their individual levels of authorization. Upon configuration, token configuration engine 302 may store one or more copies of the configured token in memory 202 and/or database 203, and may provide a copy of the token to the third party service provider 103 via network 104.

The information contained within the token is invariably sensitive, private information and, before the token leaves the secured environment of cloud platform 101, certain steps may help to ensure that unauthorized parties are not able to access, view, and use the information. In some embodiments, token configuration engine 302 may configure additional encryption for the token. In other embodiments, token configuration engine 302 may implement a password protection scheme for the token. In these embodiments, the password protection scheme may further comprise configuring and implementing additional security questions to further limit access. In some embodiments, cloud platform 101 may generate terms of service or other similar security and usage agreements, and require acknowledgement of the terms of service by third party service provider 103. The token may be configured with one or more layers of required authorization (for example, using the OAuth 2 standard), and may require verification by one or both of cloud platform 101 or third party service provider 103 to display or access authorization data contained within the token. Token configuration engine 302 may configure the token so the information contained within the token cannot be downloaded by any end user. In some embodiments, the configured token security credentials may include biometric or other physical characteristics provided by one or more of banking system 102 or third party service provider 103 to access the authorized data or functions. In other embodiments, the credentials may include physical devices required for access, such as a key, dongle, card, or other such device. Token configuration engine 302 may further configure the token to operate under Hypertext Transfer Protocol Secure (HTTPS) or other comparable security protections over network 104.

Figure 8:
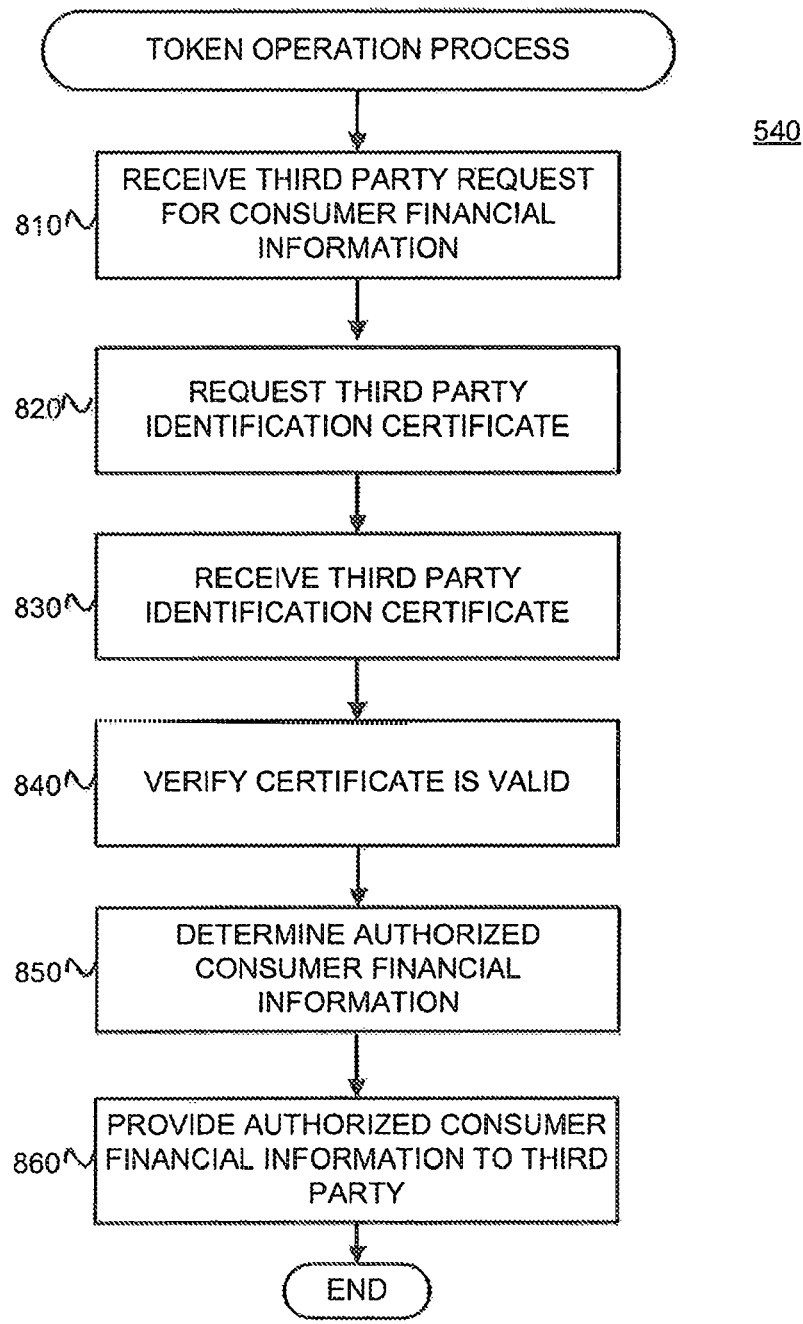
FIG. 8 is an example of a token operation process, consistent with disclosed embodiments.

FIG. 8 illustrates a token operation process (corresponding to Step 540 of process 500 disclosed above) consistent with certain disclosed embodiments. Process 540, as well as any or all of the individual steps therein, may be performed by any one or more of cloud platform 101, banking system 102, third party service provider 103, or mobile device 106. For exemplary purposes, FIG. 8 is described as being performed by cloud platform 101.

Cloud platform 101, via token operation engine 303, may receive a request from third party service provider 103 to access consumer financial information, such as banking data and functions as described previously (Step 810). The request may be received electronically via network 104, or may be received by alternative means such as by telephone or by postal mail.

In some embodiments, token operation engine 303 may request (Step 820) and receive (Step 830) a previously-configured digital certificate for purposes of identification. In some embodiments, token configuration engine 302 may have configured the certificate for the third party as part of the authorization or token configuration processes described above, or may have done so at the onset of a business relationship between cloud platform 101 and third party service provider 103.

Token operation engine 303 may verify that the Identification certificate proffered by third party service provider 103 is valid (Step 840). The verification of the certificate may be performed by any means known to those possessing ordinary skill in the art. As an example, processor 204 may read information contained in the certificate, compare it to identification information stored in memory 202 and/or database 203, and upon confirmation that the proffered information matches the stored information for the certificate, provide a notification to the third party service provider computer system (not shown) that the certificate is valid.

Token operation engine 303 may determine consumer financial data and/or functions that the third party is authorized to access for a given consumer (Step 850). As discussed previously, a "token" in the context of the disclosed embodiments is a configured software object containing information relating to access levels to various types of consumer data or functions for a given third party service provider. For example, token operation engine 303, via processor 204, may read a token proffered by third party service provider 103, and determine from the stored information therein which consumer data or functions, if any, that the third party is authorized to access.

Token operation engine 303 may compare the authorized information stored within the token to the specific data and functions that the third party has requested to access. If the request exceeds the authorization levels stored in the token, token operation engine 303 may deny access to the unauthorized data or functions, and may provide an indication as such to third party service provider 103. If the requested data and/or functions are authorized based on the token information, token operation engine 303 may provide access to the data and/or functions (Step 860). In some embodiments, token operation engine 303 may permit only access to the data, not digital copies of the data Itself, in order to provide security and prevent unauthorized dissemination of sensitive financial information. In these embodiments, access to the data is provided via remote, cloud-based, read-only access, and the consumer data is not transmitted to the third party service provider. Token operation engine 303 may provide access to the stored financial data or functions from within memory 202 and/or database 203 via a link over network 104, or may provide access to that information directly from banking system 102 over network 104. In some embodiments, any or all of cloud platform 101, banking system 102, or the individual consumer (via authorization engine 404 of mobile device 106) may be configured to revoke authorization and access by third party service provider 103 to specific data or services at any time subsequent to an initial authorization. In these embodiments, as discussed above, token configuration engine 302 may revoke or otherwise cancel the initially configured token. If some level of more limited access by third party service provider 103 is still authorized, token configuration engine 302 may configure a new token based on the revised authorization and access circumstances.

Figure 9:
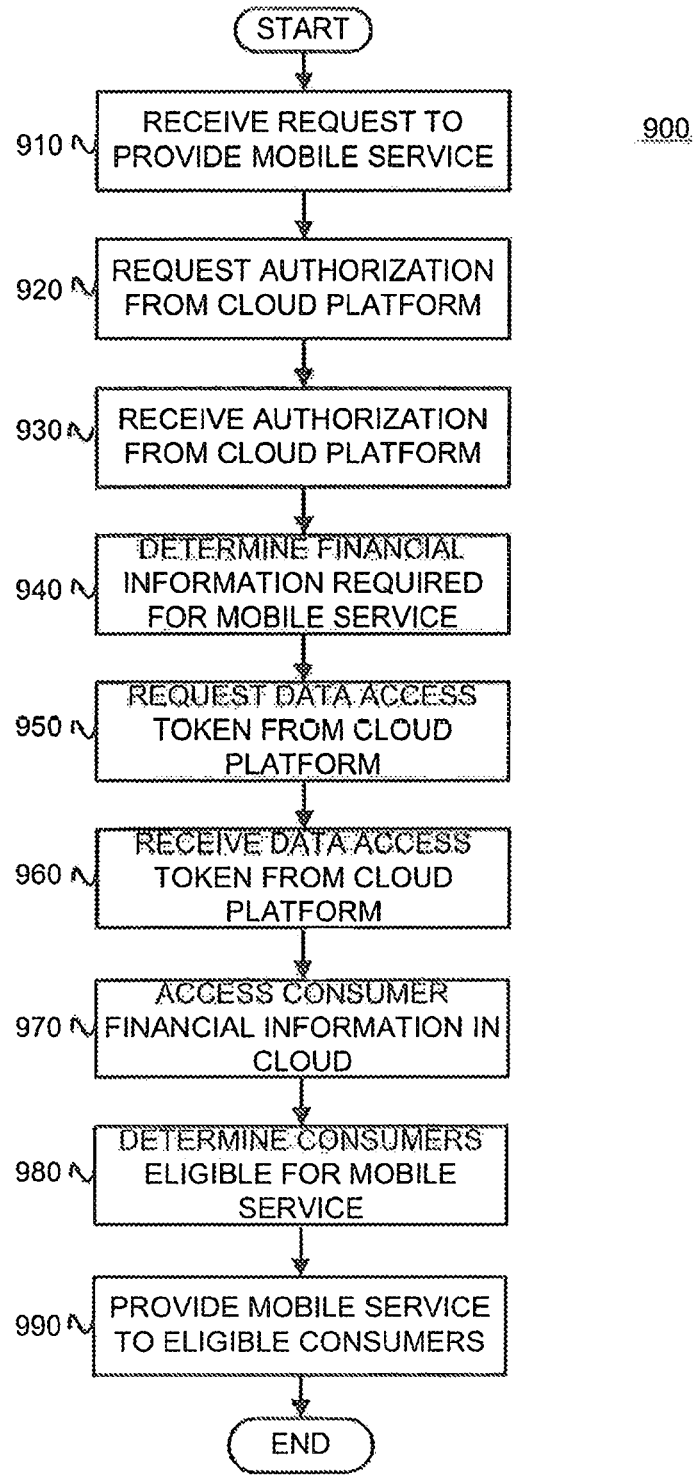
FIG. 9 is an example of a third party application operation process, consistent with disclosed embodiments.

FIG. 9 illustrates a third party application operation process 900 consistent with certain disclosed embodiments. Process 900, as well as any or all of the individual steps therein, may be performed by any one or more of cloud platform 101, banking system 102, third party service provider 103, or mobile device 106. For exemplary purposes, FIG. 8 is described as being performed by third party service provider 103.

In one embodiment, third party service provider 103 may receive a request from a consumer to provide a mobile service (Step 910). The request may be received from mobile device 106, and may comprise a request or invitation for third party service provider 103 to perform or provide a mobile service to the consumer using consumer financial data. In some embodiments, the request may be associated with a mobile application 402 that is associated with one or more of the consumer, a financial service account provider, such as that associated with banking system 102, or third party service provider 103. In alternative embodiments, the third party service provider may offer a mobile service or application to the consumer via mobile device 106 or other means over wireless carrier network 105, and may receive an indication of offer acceptance from mobile device 106.

Third party service provider 103 may request (Step 920) and receive (Step 930) authorization to seek access to consumer financial information. This authorization may be achieved in substantially the same manner as that described in authorization process 520 described above. Furthermore, third party service provider 103 may seek and secure authorization via cloud platform 101 from the consumer and from banking system 102. In some embodiments, the consumer may authorize third party service provider 103 as part and parcel of their initial request for the mobile service.

Third party service provider 103 may determine consumer financial data or functions required to perform the requested mobile service (Step 940). In some embodiments, third party service provider 103 may have previously configured application 402 to provide the requested mobile service, and application 402 may contain information relating to the required data or functions.

After determining the consumer financial data and/or functions necessary to perform the requested mobile service(s), third party service provider 103 may request (Step 950) and receive (Step 960) access to those data and/or functions via cloud platform 101. In some embodiments, cloud platform 101 (via token configuration engine 302) may respond to the third party request by performing a token configuration process substantially similar to token configuration process 530 described above.

After receiving the configured token from cloud platform 101, third party service provider 103 may, instantaneously or at a later time, proffer the token to cloud platform 101 to access the required consumer financial data and/or functions (Step 970). In some embodiments, cloud platform 101 (via token operation engine 303) may respond to the third party proffering of the token by performing a token operation process substantially similar to token operation process 540 described above.

In some embodiments, the foregoing steps complete the process, and with access to the necessary consumer financial data and/or functions, third party service provider 103 may provide the requested mobile service to the consumer via one or more mobile applications 402 contained within memory 401 and executed by processor 405 of mobile device 106. In alternative embodiments, however, third party service provider 103 may prompt a consumer to accept a service or an offer relating to consumer financial information spontaneously, without receiving a previous request from the consumer. As a non-limiting example, third party service provider 103 may be an entity engaged in the advertising Industry. Third party service provider 103 may receive a request from one of its clients, such as a merchant providing goods and services to consumers. The merchant may desire to provide certain consumers with incentive offers, free items, gift cards, or the like to promote its business, and may employ third party service provider 103 to access the consumer data in order to provide those items.

In these embodiments, third party service provider 103 may perform additional operational steps. Third party service provider 103 may determine consumers who are eligible or otherwise targeted for a mobile service, such as the incentive offers, gift cards, etc., disclosed above (Step 980). For example, if third party service provider 103 is tasked with providing an incentive offer to patrons of a restaurant, third party service provider 103 may desire to access transaction histories of consumers to determine individuals who have recently dined at the restaurant. The restaurant may then provide the consumers with offers as an incentive for a repeat visit. Alternatively, third party service provider 103 may use the transaction history information to determine individuals who have recently dined at other restaurants (e.g., competitors). The restaurant may be interested in providing these consumers with a particular incentive offer in order to increase their market share relative to the other competing restaurants. Therefore, third party service provider 103 may seek authorization to access consumer financial data as described above. Third party service provider 103 may then determine specific consumers to target for the mobile service based on to the accessed consumer financial data and/or functions. After accessing the data and determining the consumers that are eligible for the mobile offer/service, third party service provider 103 may provide the mobile service to the eligible consumers using the processes described previously (Step 990).

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. For example, the described implementations include software, but systems and methods consistent with the disclosed embodiments be implemented as a combination of hardware and software or in hardware alone. Examples of hardware include computing or processing systems, including personal computers, servers, laptops, mainframes, micro-processors and the like. Additionally, although aspects of the disclosed embodiments are described as being stored in memory, one skilled in the art will appreciate that these aspects can also be stored on other types of computer readable media, such as secondary storage devices, for example, hard disks, floppy disks, or CD ROM, or other forms of RAM or ROM, USB media, DVD, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is Intended, therefore, that the specification and examples be considered as illustrative only, with a true scope and spirit being indicated by the following claims and their full scope of equivalents.

What is claimed is:

1. A system for configuring mobile applications executable on mobile devices by providing cloud-based access to consumer financial data, comprising:
   a memory storing instructions; and
   a processor configured to execute the instructions to:
      receive a request from an entity configuring a mobile application on a mobile device to access consumer data on a cloud platform, the consumer data being associated with a financial service account;
      determine a financial service account provider has authorized access by the entity to at least a portion of the consumer data;
      determine that a consumer associated with the financial service account has granted authorization for the entity to configure the mobile application by accessing the portion of the consumer data;
      configure a digital certificate identifying the entity and the portion of the consumer data that the entity is authorized to access;
      receive a request from the entity to configure the mobile application by accessing the authorized consumer data;
      verify the configured digital certificate; and
      provide, to the entity, access to the authorized consumer data.

2. The system of claim 1, wherein the digital certificate comprises a Secure Sockets Layer (SSL) certificate.

3. The system of claim 1, wherein the authorized consumer data is provided to the entity via remote read-only access, and the consumer data is not transmitted to the entity.

4. The system of claim 3, wherein the consumer data is provided to the entity via a link to an external computing system associated with the financial service account provider.

5. The system of claim 1, wherein the consumer data comprises one or more of information associated with a consumer financial services account or a banking function associated with the account.

6. The system of claim 5, wherein the information associated with the consumer financial services account comprises one or more of financial services accounts associated with the consumer, account balances of a consumer financial services account, transactions processed with the consumer financial services account, the credit score of the consumer, or demographic information associated with the consumer.

7. The system of claim 5, wherein the banking function associated with the account comprises one or more of configuring account related alerts, configuring automatic bill payment, transferring funds among financial services accounts associated with the consumer, transferring funds to external accounts, and searching for nearby locations associated with the financial services account provider.

8. The system of claim 1, wherein configuring the digital certificate further comprises generating information designating at least one of:
   a portion of the consumer data that the entity is authorized to access; and
   a portion of the consumer data that the entity is not authorized to access.

9. A non-transitory computer-readable medium storing instructions executable by a processor to cause a computer system to execute a method for configuring mobile applications executable on mobile devices by providing cloud-based access to consumer financial information, comprising:
   receiving a request from an entity configuring a mobile application on a mobile device to access consumer data on a cloud platform, the consumer data being associated with a financial service account;
   determining a financial service account provider has authorized access by the entity to at least a portion of the consumer data;
   determining that a consumer associated with the financial service account has granted authorization for the entity to configure the mobile application by accessing the portion of the consumer data;
   configuring a digital certificate identifying the entity and the portion of the consumer data that the entity is authorized to access;
   receiving a request from the entity to configure the mobile application by accessing the authorized consumer data;
   verifying the configured digital certificate; and
   providing, to the entity, access to the authorized consumer data.

10. The non-transitory computer-readable medium of claim 9, wherein the digital certificate comprises a Secure Sockets Layer (SSL) certificate.

11. The non-transitory computer-readable medium of claim 9, wherein the authorized consumer data is provided to the entity via remote read-only access, and the consumer data is not transmitted to the entity.

12. The non-transitory computer-readable medium of claim 11, wherein the consumer data is provided to the entity via a link to an external computing system associated with the financial service account provider.

13. The non-transitory computer-readable medium of claim 9, wherein the consumer data comprises one or more of information associated with a consumer financial services account or a banking function associated with the account.

14. The non-transitory computer-readable medium of claim 13, wherein information associated with the consumer financial services account comprises one or more of financial services accounts associated with the consumer, account balances of a consumer financial services account, transactions processed with the consumer financial services account, the credit score of the consumer, or demographic information associated with the consumer.

15. The non-transitory computer-readable medium of claim 13, wherein the banking function associated with the account comprises one or more of configuring account related alerts, configuring automatic bill payment, transferring funds among financial services accounts associated with the consumer, transferring funds to external accounts, and searching for nearby locations associated with the financial services account provider.

16. The non-transitory computer-readable medium of claim 9, wherein configuring the digital certificate further comprises generating information designating at least one of:
- a portion of the consumer data that the server is authorized to access; and
- a portion of the consumer data that the server is not authorized to access.

17. A computer-implemented method for configuring mobile applications executable on mobile devices by providing cloud-based access to consumer financial information, comprising:
- receiving a request from an entity configuring a mobile application on a mobile device to access consumer data on a cloud platform, the consumer data being associated with a financial service account;
- determining that a financial service account provider authorizes access by the entity to at least a portion of the consumer data;
- determining that a consumer associated with the financial service account has granted authorization for the entity to configure the mobile application by accessing the portion of the consumer data;
- configuring a digital certificate identifying the entity server and the portion of the consumer data that the entity is authorized to access;
- receiving a request from the entity to configure the mobile application by accessing the authorized consumer data;
- verifying the configured digital certificate; and
- providing, to the entity, access to the authorized consumer data.

18. The method of claim 17, wherein the consumer data comprises one or more of information associated with a consumer financial services account or a banking function associated with the account.

19. The method of claim 18, wherein the information associated with the consumer financial services account comprises one or more of financial services accounts associated with the consumer, account balances of a consumer financial services account, transactions processed with the consumer financial services account, the credit score of the consumer, or demographic information associated with the consumer.

20. The method of claim 18, wherein the banking function associated with the account comprises one or more of configuring account related alerts, configuring automatic bill payment, transferring funds among financial services accounts associated with the consumer, transferring funds to external accounts, and searching for nearby locations associated with the financial services account provider.

* * * * *